US007751328B2

(12) United States Patent
Kloth

(10) Patent No.: US 7,751,328 B2
(45) Date of Patent: Jul. 6, 2010

(54) SYSTEM AND METHOD FOR EFFICIENT NETWORK FLOW CONTROL

(75) Inventor: Raymond Kloth, Saratoga, CA (US)

(73) Assignee: Cisco Technology, Inc., San Jose, CA (US)

( * ) Notice: Subject to any disclaimer, the term of this patent is extended or adjusted under 35 U.S.C. 154(b) by 677 days.

(21) Appl. No.: 11/356,893

(22) Filed: Feb. 17, 2006

(65) Prior Publication Data

US 2007/0195699 A1 Aug. 23, 2007

(51) Int. Cl.
*G06F 13/00* (2006.01)
(52) U.S. Cl. .................................. 370/235; 709/235
(58) Field of Classification Search .......... 370/229, 370/235; 709/238, 240, 235
See application file for complete search history.

(56) References Cited

U.S. PATENT DOCUMENTS

| 5,313,454 | A | | 5/1994 | Bustini et al. |
| 5,898,691 | A | | 4/1999 | Liu |
| 6,167,029 | A | * | 12/2000 | Ramakrishnan ............. 370/235 |
| 6,295,281 | B1 | | 9/2001 | Itkowsky et al. |
| 6,628,613 | B1 | | 9/2003 | Joung et al. |
| 6,754,179 | B1 | * | 6/2004 | Lin ............................. 370/235 |
| 6,973,072 | B1 | | 12/2005 | Muntz |
| 2004/0205266 | A1 | | 10/2004 | Regal et al. |
| 2008/0020746 | A1 | * | 1/2008 | Alexandar et al. .......... 455/423 |
| 2008/0071924 | A1 | * | 3/2008 | Chilukoor ................... 709/240 |

OTHER PUBLICATIONS

D.R.Irvin, "Embedding a secondary communication channel transparently within a cyclic redundancy check (CRC)", IBM journal of Research and Development; Nov. 2001, vol. 45.*

"TechFest Ethernet Technical Summary," http://www.techfest.com/networking/lan/ethernet3.htm, TechFest.com, site accessed Jan. 5, 2006.

IEEE Standard for Information technology, Telecommunications and Information Exchange Between Systems, Local and Metropolitan Area Networks, Specific Requirements, Part 3: Carrier Sense Multiple Access with Collision Detection (CSMA/CD) Access Method and Physical Layer Specifications, IEEE Computer Society, New York, NY, Mar. 8, 2002.

PCT Notification of Transmittal of the International Search Report and the Written Opinion of the International Searching Authority, or the Declaration, International Application No. PCT/US07/03084, International Filing Date: Feb. 6, 2007, Date of Mailing: Oct. 29, 2007, 8 pages.

* cited by examiner

*Primary Examiner*—William Trost, IV
*Assistant Examiner*—Siming Liu
(74) *Attorney, Agent, or Firm*—Cesari and McKenna, LLP

(57) ABSTRACT

A system enables efficient flow control in computer network. In the preferred embodiment, when an entity detects an impending full condition, it cuts short its transmission of the current frame that is being sent, and immediately sends a pause signal. The entity also deliberately corrupts the error detection signature of the cut-off frame to ensure that whatever portion of it that may have been sent is discarded. After sending the pause signal, the entity re-sends the cut-off frame in its entirety. Upon receiving a pause signal, the receiving entity cuts short the current frame being transmitted to the entity that sent the pause signal. The receiving entity also corrupts the correction value of this cut-off frame. The receiving entity suspends its transmission of frames to the entity that sent the pause signal for a period of time. When the pause period expires, the receiving entity re-sends the cut-off frame in its entirety, and resumes the transmission of frames.

17 Claims, 6 Drawing Sheets

SYSTEM AND METHOD FOR EFFICIENT NETWORK FLOW CONTROL

BACKGROUND OF THE INVENTION

1. Field of the Invention

The present invention relates to computer networks and, more specifically, to the flow of messages through a computer network.

2. Background Information

Many organizations, including businesses, governments and educational institutions, utilize computer networks so that employees and others may share and exchange information and/or resources. A computer network typically comprises a plurality of entities interconnected by means of one or more communications media. An entity may consist of any device, such as a computer, that "sources" (i.e., transmits) or "sinks" (i.e., receives) messages, such as data frames, over the communications media. A common type of computer network is a local area network ("LAN") which typically refers to a privately owned network within a single building or campus. LANs typically employ a data communication protocol (LAN standard), such as Ethernet, FDDI or token ring, that defines the functions performed by data link and physical layers of a communications architecture (i.e., a protocol stack). An exemplary LAN standard is the Institute of Electrical and Electronics Engineers (IEEE) 802 family of protocols, which includes a physical layer, often called Layer 1 (L1), and a data-link layer, often called Layer 2 (L2).

Congestion Control

The IEEE Std. 802.3-2002 protocol includes a provision for responding to congestion within the network. In particular, Annex 31B of IEEE Std. 802.3-2002 describes the MAC Control PAUSE Operation, which is used to inhibit the transmission of data frames for a specified period of time. Suppose, for example, that Stations A and B are interconnected through a computer network. If Station A begins transmitting frames to Station B faster than Station B can process them, the frames will overload Station B's buffer space. In response to this condition, Station B can issue a PAUSE frame. The PAUSE frame can be either a unicast frame addressed to Station B, or a multicast frame sent to a predefined multicast address. The PAUSE frame carries an operation code (opcode) indicating that it is a PAUSE frame, and a timer field that specifies how long the recipient should suspend further traffic to Station A. Upon receiving the PAUSE frame, Station A suspends further transmission of frames to Station B until the specified time period expires. This allows Station B to process the frames in its buffer, thereby freeing space within the buffer to accept additional frames. Although the PAUSE Operation generally works well with some network entities, a need exists for an improved flow control technique that works well with other devices.

SUMMARY OF THE INVENTION

Briefly, the invention relates to a system for enabling efficient flow control between a source entity and a destination entity of a computer network. Each entity includes transmitting and receiving units for sending and receiving network messages, such as frames, to and from the other entity. The receiving unit includes an input buffer for temporarily storing the frames received by the respective entity, and a pause detector that is coupled to the buffer. The pause detector monitors the buffer to see if it is about to reach a "full" condition. The transmitting unit includes an output buffer, a cyclic redundancy check (CRC) generator, and a pause frame generator. The CRC generator computes an error checking value for frames to be transmitted, and appends the error checking values to the respective frames prior to their transmission. Each entity further includes a flow control engine that is coupled to both the transmitting unit and the receiving unit at the respective entity.

According to the invention, when the pause detector at the destination entity determines that the input buffer is reaching a full condition, it signals the flow control engine. The flow control engine directs the transmitting unit to truncate the current frame being transmitted, and directs the CRC generator to deliberately corrupt the error checking value appended to this now truncated frame. The flow control engine then directs the pause frame generator to generate and transmit one or more pause frames. The flow control engine next directs the transmitting unit to re-send the current frame, which had been previously sent with a corrupted error checking value, after the one or more pause frames have been transmitted. This time, however, there is no truncation of the frame; instead, the entire frame is sent with a valid error checking value.

At the source entity, the receiving unit notifies the flow control engine that a pause frame has been received. In response, the flow control engine directs the transmitting unit to truncate any current frame being sent to the destination entity. The flow control engine also directs the CRC generator to corrupt the error checking value of this truncated frame. The flow control engine also directs the transmitting unit to suspend further transmission of frames to the destination entity for a period of time. Once the time period has expired, the source entity resumes sending frames to the destination entity, including a complete version of the frame that had been truncated in response to the receipt of the pause frame.

BRIEF DESCRIPTION OF THE DRAWINGS

The invention description below refers to the accompanying drawings, of which.

DETAILED DESCRIPTION OF AN ILLUSTRATIVE EMBODIMENT

Figure 1:
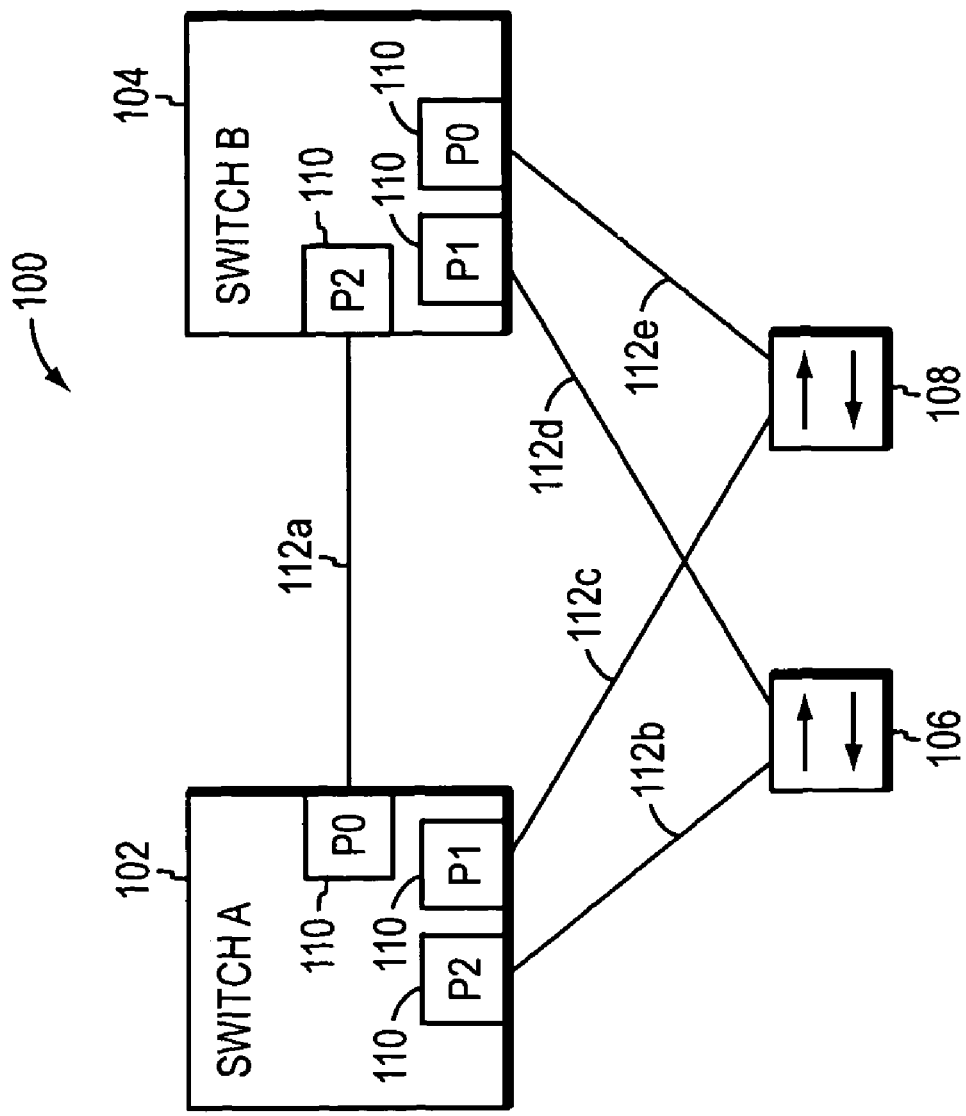
FIG. 1 is a highly schematic illustration of a computer network in accordance with the present invention.

FIG. 1 is a highly schematic illustration of a computer network 100. Network 100 includes a plurality of interconnected devices, such as switches 102 (Switch A), 104 (Switch B), 106 and 108. Each switch 102-108 has a plurality of ports 110 for interconnecting it with other network entities, such as end stations, hubs, routers, local area network (LAN) segments, other bridges, etc. The ports 110, moreover, perform functions corresponding to a Physical (PHY) Layer (L1) and a Media Access Control (MAC) Layer (L2) of a protocol stack, such the TCP/IP stack. The PHY and MAC layers communicate with each other through one or more interfaces. In particular, the MAC layer passes control and data frames to the PHY layer for transmission from the port 110, and receives control and data frames, which were captured by the PHY layer. The PHY layer encodes and decodes data that is being transmitted, while the MAC layer schedules and controls the transmission and reception of control and data frames. Some ports may provide additional layers of communications services beyond the PHY and MAC layers.

As shown in FIG. 1, switches 102-108 are interconnected with each other by a plurality of links 112a-e. These links 112a-e may be, for example, point-to-point links, wireless connections, shared media or various combinations thereof. Each bridge 102-108, moreover, preferably identifies its ports, e.g., by port numbers such as zero (P0), one (P1), two (P2), etc., so that it can associate specific ports with the network entities that are reachable through those ports.

In the preferred embodiment, Switches 102-108 are compliant with one or more of the IEEE 802.3 standards, such as IEEE Std. 802.3-2002, which is hereby incorporated by reference in its entirety.

It should be understood that the network 100 of FIG. 1 is meant for illustrative purposes only, and that the present invention will operate with other networks having possibly far more complex topologies.

The physical layer deals with transmitting and receiving a carrier that supports a data-bearing signal across a transmission medium. Functions performed at the physical layer typically include encoding/decoding signals, generating/removing preamble information used for synchronization, and transmitting and receiving bits on the transmission medium. The data-link layer handles data frames, and performs flow and error control. The data-link layer typically comprises a medium access control (MAC) sub-layer and a logical link control (LLC) sub-layer. The MAC sub-layer assembles data to be transmitted into a frame with address and error detection fields, disassembles received frames, performs address recognition and error detection, and governs access to the LAN transmission medium. The LLC sub-layer provides an interface to higher layers and performs flow and error control.

To deal with errors caused during transmission of frames, most LAN standards include some form of error detection. Error detection allows the receiver to deduce that an error exists in a received frame. In response, the receiver may request retransmission of the frame. The IEEE Ethernet (802.3) standard, for example, specifies a 32 bit error detection algorithm known as the cyclic redundancy check (CRC) algorithm, which provides up to $10^{10}$ bits of error detection. In particular, a k-bit data frame is processed to generate an n-bit Frame Check Sequence (FCS) that is appended to the frame such that the resulting frame, consisting of k+n bits, is exactly divisible by some number. A receiving entity divides the frame by the agreed-upon number and determines whether a remainder exists. If so, the receiving entity concludes that an error exists and requests retransmission of the frame.

When an Ethernet frame is received at a switch, an FCS value is computed and compared against the FCS value appended to the received frame. If an error is found, i.e., the two FCS values do not match, the frame is discarded. Since most source entities retransmit frames that are not acknowledged, the discarded frame will be retransmitted by the source entity. If no error is detected, the frame is switched onto the corresponding destination port for forwarding to the intended recipient. If the switch modifies any of the frame's contents, it generates a new FCS value for the frame. By checking received frames, switches avoid transporting defective frames, thereby conserving network resources.

Although as described above the conventional PAUSE Operation defined in IEEE Std. 802.3-2002 appears to work well for conventional switches and other devices having conventionally sized buffers, it is inadequate for other devices that have smaller buffers. For example, efforts have recently begun toward creating a switch-on-a-chip, in which a single microchip is provided with all or nearly all of the functionality of a network switch or bridge. Because of the size constraints imposed on modern chip architectures, the buffers used on the chip are extremely small.

For example, an entity may be in the process of transmitting a large frame, such as a Jumbo Ethernet frame, which might be on the order of 20 kilobytes (KB) or more, when it determines that a PAUSE frame should be issued. The entity must wait for the Jumbo Ethernet frame to be transmitted before sending the PAUSE frame. The issuance of this Jumbo Ethernet frame, moreover, may cause the receiving entity to send a Jumbo Ethernet frame back to the first entity, consuming additional buffer space. In addition, by the time the receiving entity realizes that it has received a PAUSE frame, it may have already sent (or be in the process of sending) additional Jumbo Ethernet frames, causing additional buffer space to be consumed. As described herein, the present invention relates to an improved flow control system and method.

Figure 2:
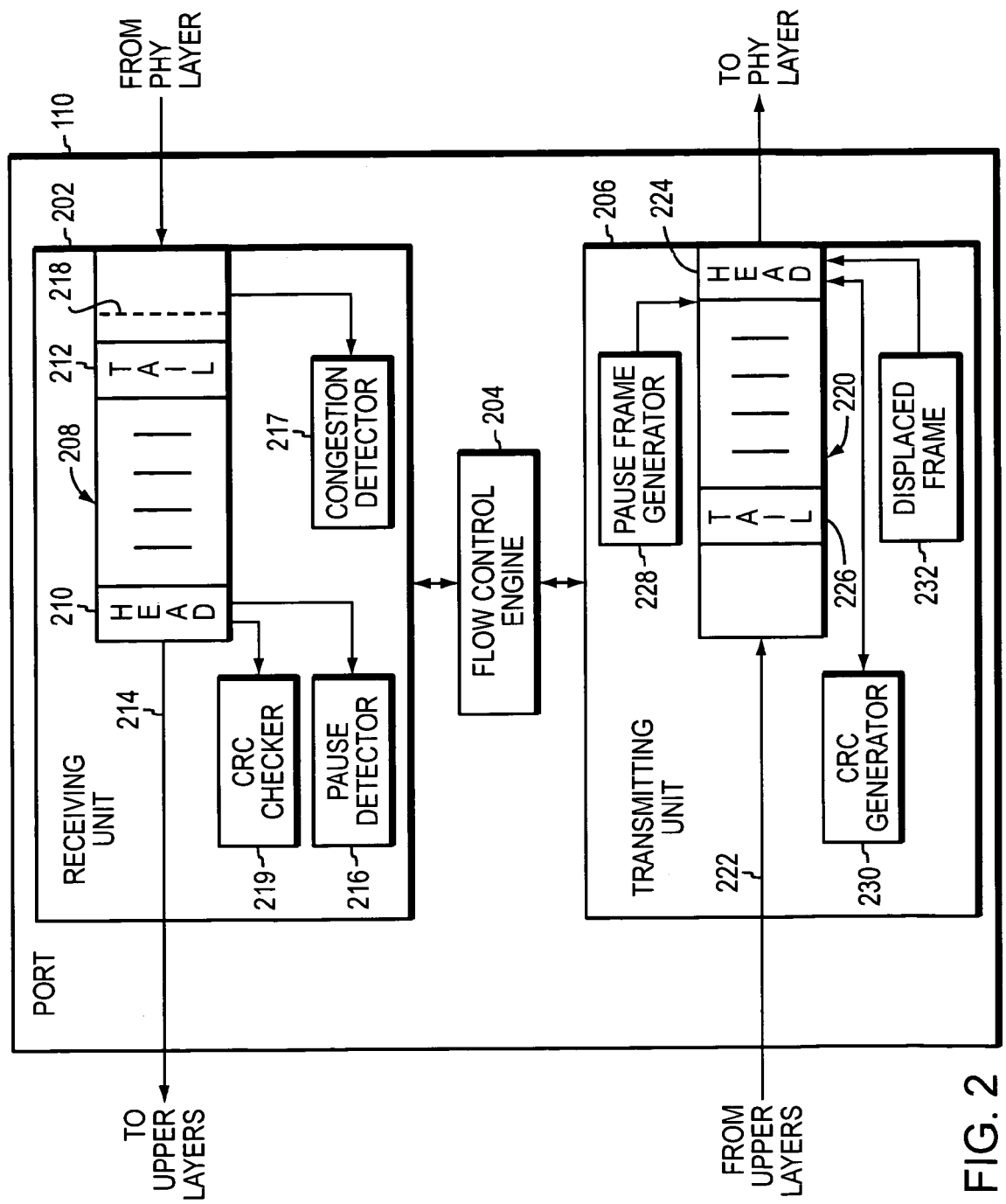
FIG. 2 is a partial, functional block diagram of a network entity.

FIG. 2 is a highly schematic, partial illustration of a port 110, such as port P0 at Switch A 102. The port 110 includes a receiving unit 202, a flow control engine 204, and a transmitting unit 206, which implement at least part of the port's MAC layer of communications services. The receiving unit 202 includes one or more input buffers, such as input buffer 208. As control and data frames are received from PHY layer they are temporarily stored by the port 110 in the input buffer 208. The input buffer 208 may be a first-in-first-out (FIFO) buffer or queue. The input buffer 208 thus includes a head 210, which stores the first control or data frame received, and a tail 212, which stores the last control or data frame received. The receiving unit 202 takes the control or data frame at the head 210 of the input buffer 208, processes it, and passes it to an upper layer or other component, as necessary, as illustrated by arrow 214. The control and data frames remaining in input buffer 208 are then moved up, thereby freeing up space within the input buffer 208 to receive addition control and data frames.

Receiving unit 202 includes several additional components. Specifically, it includes a pause detector 216 that is operably connected to the input buffer 208. The pause detector 216 monitors the input buffer 208 to see whether a Pause frame has been received. Receiving unit 202 also includes a congestion detector 217 that monitors the utilization of the input buffer 208 to see whether there is a potential that the buffer 208 may become full. For example, the congestion detector 217 may determine whether the number of bytes stored in the input buffer 208 meets or exceeds some predetermined threshold, illustrated by dashed line 218. Receiving unit 202 also has a cyclic redundancy check (CRC) checker 219 that computes an error detection signature for received frames, and compares the computed error detection signature with the signature appended to the received frames.

The transmitting unit 206 includes one or more output buffers, such as output buffer 220. As control and data frames are received by the port 110 from the upper layers for transmission, as indicated by arrow 222, they are temporarily stored in output buffer 220. Output buffer 220 may also be a FIFO, and have a head 224 and a tail 226. Operably coupled to the output buffer 220 are a pause frame generator 228, and a cyclic redundancy check (CRC) generator 230. As described herein, the pause frame generator 228 is configured to generate PAUSE frames, and to insert them into the output buffer 220 for transmission from port 110. The CRC generator 230 is configured to compute an error detection signature, such as a Frame Check Sequence (FCS), for each control and data frame to be transmitted from the port 110, and to append this FCS to the respective control or data frame. The transmitting unit 206 takes the control or data frame at the head 224 of the output buffer 220, and passes to the PHY layer for transmission from the port 110. The remaining control and data frames within output buffer 220 are then moved up, thereby freeing up space within buffer 220 for more control and data frames.

In the preferred embodiment, the output buffer 220 is a linked list of storage elements with a pointer that can be adjusted to identify the current frame to be transmitted, i.e., to the head of the linked list. Once the current frame has been fully transmitted, those elements that stored the transmitted frame are returned to a free memory list, and may be used to store a new frame to be transmitted. If a frame needs to be retransmitted, the pointer to that frame is re-loaded. In an alternative embodiment, the transmitting unit 206 may be configured to have a displaced frame holder 232, such as a register, sized to hold a single control or data frame.

The flow control engine 204 is operably coupled to both the receiving unit 202 and the transmitting unit 206. As described herein, the flow control engine monitors and controls at least part of the operation of the receiving and transmitting units 202, 206.

In the illustrative embodiment, Switch A 102 is a switch-on-a-chip. That is the switch 102 is formed on an integrated circuit (IC). More specifically, the port 110 may comprise registers and combinational and/or programmable logic configured and arranged to produce sequential logic circuits. As a result, buffers 208 and 220 are typically quite small, and cannot hold a great deal of control and data frames. Generally, input buffer 208 is at least greater than one Maximum Transfer Unit (MTU) in size, e.g., 9 KB MTU.

Although the present invention is described with regard to a switch-on-a-chip, those skilled in the art will recognize that the invention may be used with a variety of network entities, such as conventional switches, bridges, hubs, routers, end stations, etc. Furthermore, those skilled in the art will recognize that the present invention may be implemented through various combinations of software and hardware, including firmware. For example, the flow control engine, among other components, may be implemented through one or more software modules or libraries stored at a memory, and containing program instructions pertaining to the methods described herein. These program instructions, moreover, may be executed by one or more processing elements.

Figure 3A:
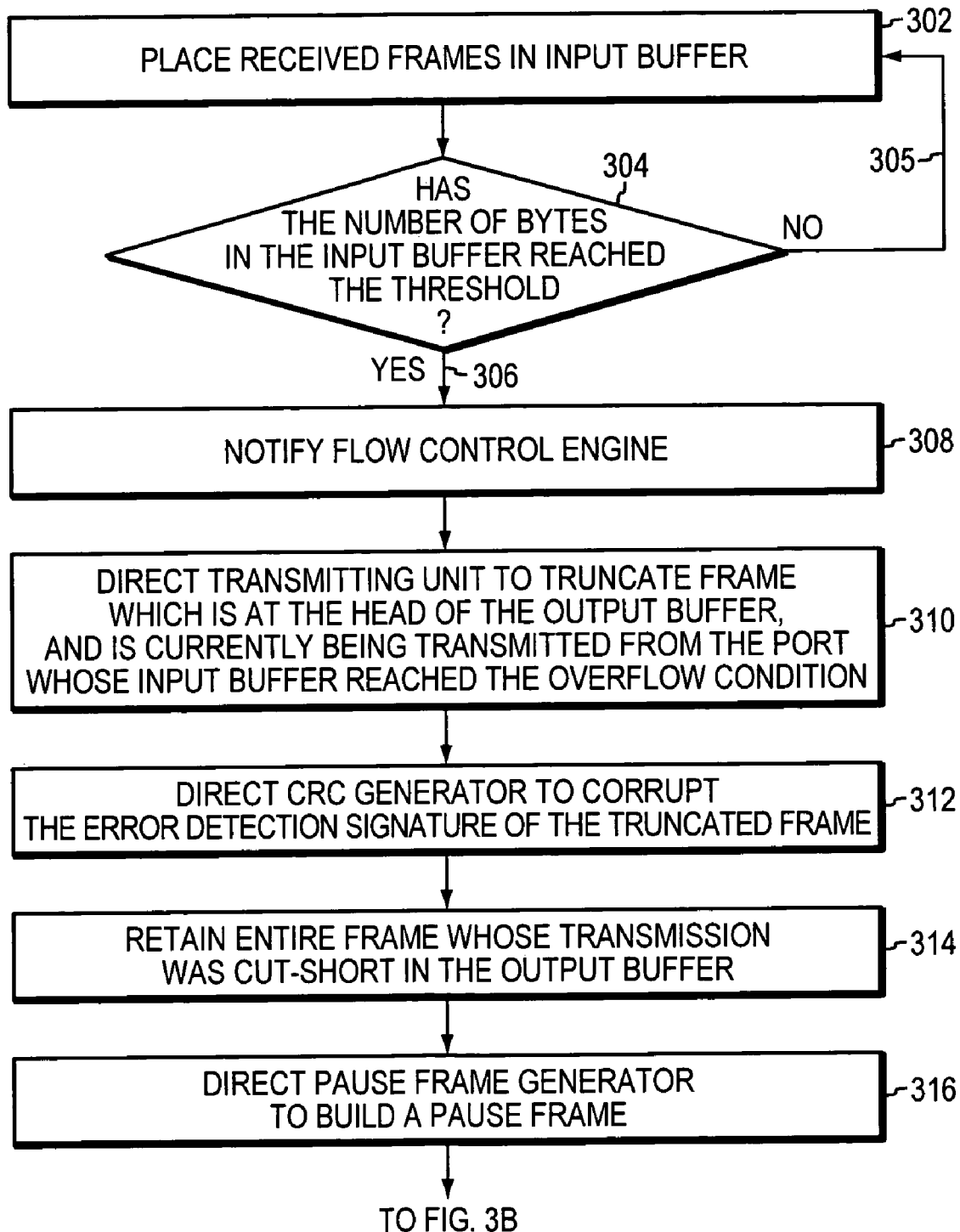
FIG. 3A-C is a flow diagram of a preferred method in accordance with the preferred embodiment.
Figure 3B:
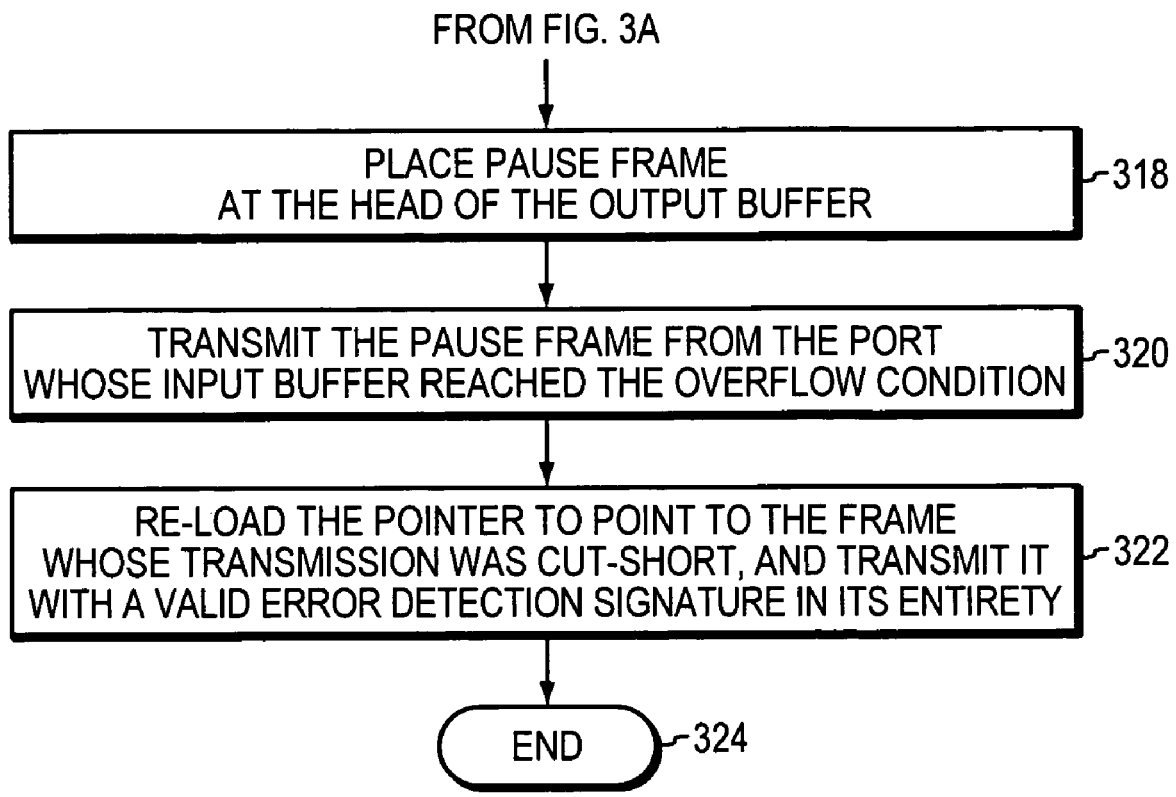
Figure 3C:
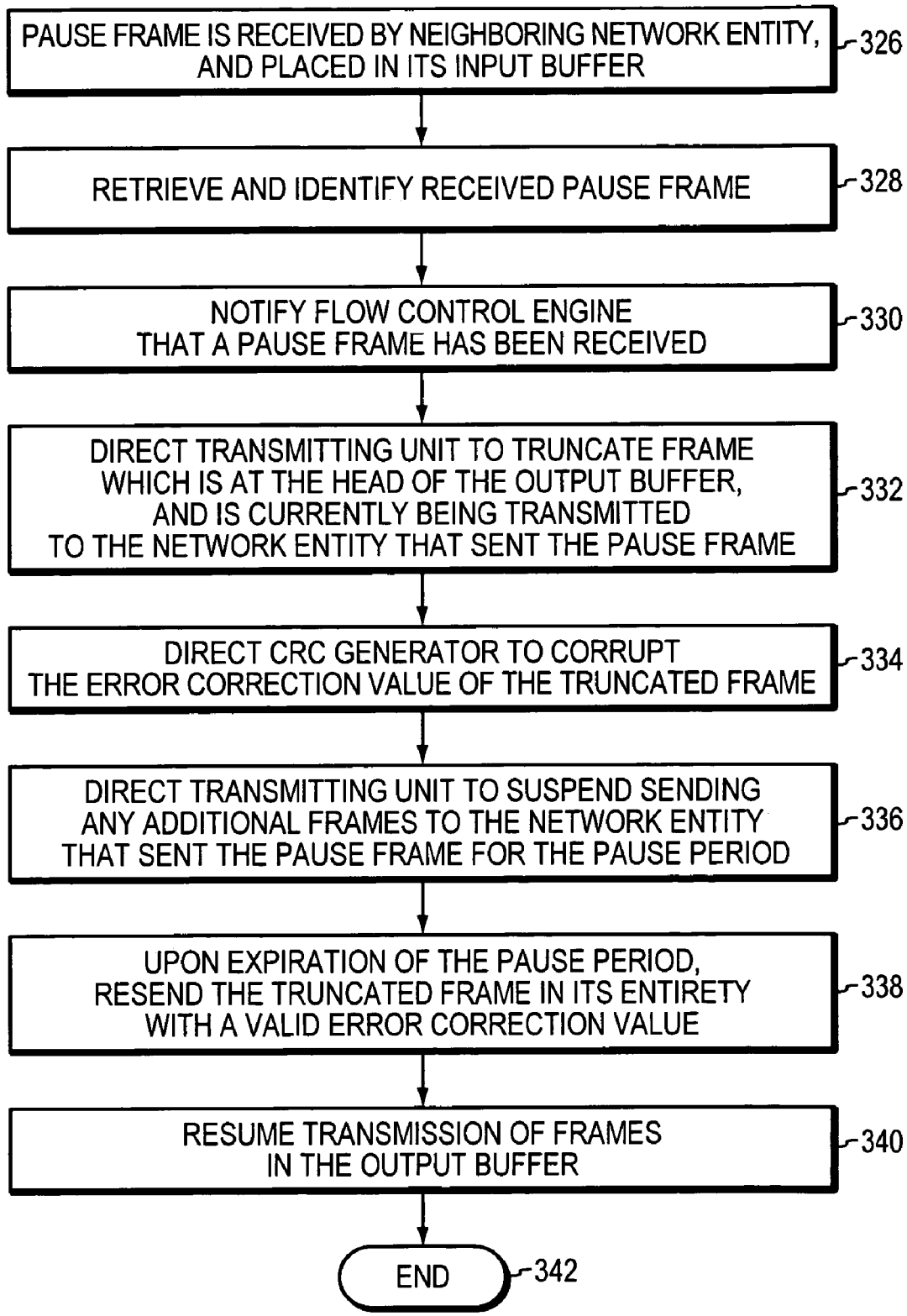

FIGS. 3A-C is a flow diagram of preferred methods in accordance with the present invention. As Switch A 102 receives control and/or data frames at port P0 110, they are temporarily stored at input buffer 208, as indicated at block 302. Suppose switch A 102 begins to receive data frames at port P0 110 faster than Switch A 102 can process them. In this case, the input buffer 208 at Switch A 102 will start to fill up with frames. Congestion detector 217 preferably checks whether the number of bytes stored at the input buffer 208 reaches and/or exceeds the threshold 218, as indicated at decision block 304. For example, congestion detector 217 may be configured periodically to check the number of bytes being stored, or upon receipt of each new frame. If the threshold has not been met, additional frames may be placed in the input buffer 208, as indicated by No arrow 305, which loops back on block 302. If the threshold is met and/or exceeded, the congestion detector 217 notifies the flow control engine 204 of this impending full condition, as indicated by Yes arrow 306 leading to block 308. The congestion detector 217 may, for example, issue a control signal to the flow control engine 204. In accordance with the preferred embodiment of present invention, the flow control engine 204 responds as set forth below.

Specifically, the flow control engine 204 preferably directs the transmitting unit 206 to truncate the frame currently at the head 224 of the output buffer 220, which frame is in the process of being transmitted from port P0 110, e.g., it is being passed to the PHY layer, as indicated at block 310. For example, suppose that, at the time the impending full condition is detected, about half of the frame at the head 224 of the output 220 buffer has already been passed to the PHY layer for transmission via link 112*a* to Switch B 104. Rather than pass the rest of the frame to the PHY layer, the transmitting unit 206 ceases any further passing of this frame to the PHY layer, as though the frame were only half as long as it really was. In addition to truncating the frame at the head 224 of the output buffer 220, the flow control engine 204 also directs the CRC generator 230 to deliberately corrupt the error detection signature, i.e., the FCS, computed for and appended to this frame, as indicated at block 312. In a preferred embodiment, the CRC generator 230 computes the corrupted error detection signature by taking the last data bit of the truncated frame and inverting it before computing the error detection signature for the truncated frame.

The truncated frame with the corrupted error detection signature traverses link 112*a* and is received at Switch B 104. In a preferred embodiment, the receiving unit at Switch B 104 is configured to determine whether the received frame's error detection signature was deliberately corrupted. In particular, the CRC checker 219 at Switch B 104 first computes an error detection signature for the received frame in the convention manner. If the computed error detection signal indicates an error with the received frame, the CRC checker 219 proceeds to compute a second error detection signature for the frame. The CRC checker 219 computes this second error detection signature with the last data bit of the received frame inverted, i.e., in the same way that Switch A 102 computed the error detection signature. If this second error detection signature passes, as here, then Switch B 104 concludes that the frame's error detection signature was deliberately corrupted. In response to learning that the error detection signature was deliberately corrupted by Switch A 102, Switch B 104 suppresses its packet error counter (not shown). By deliberately corrupting the frame's FCS, the CRC generator 230 causes the recipient of the truncated portion of the frame to discard it. In this way, the recipient is prevented from treating the truncated frame as a complete and valid frame.

In the preferred embodiment, in which the input buffer is a linked list, the entire frame whose transmission was truncated is left in the output buffer 220, and the corresponding elements are not placed on the free memory list, as indicated at block 314, until, as described herein, it can be transmitted in its entirety. In accordance with the alternative embodiment, the flow control engine 204 directs the transmitting unit 206 to move the entire frame, whose transmission was cut short, to the displaced frame holder 232.

Figure 4:
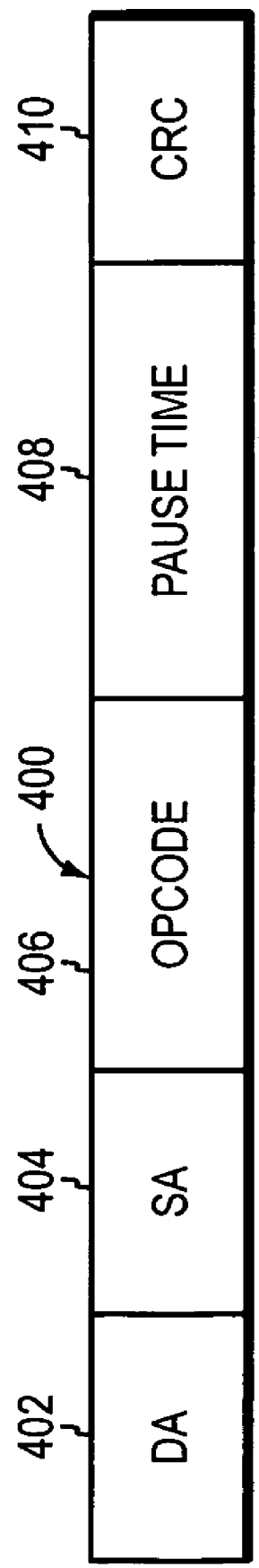
FIG. 4 is a highly schematic illustration of a network frame in accordance with a preferred embodiment of the present invention.

Next, the flow control engine 204 directs the pause frame generator 228 to generate a pause frame in order to stop the flow of additional frames into the input buffer 208, as indicated at block 316. FIG. 4 is a highly schematic, partial block diagram of a Pause frame 400. In the preferred embodiment, the format of the pause frame complies with Annex 31B of IEEE Std. 802.3-2002. The Pause frame 400 includes a destination address (DA) field 402, a source address (SA) field 404, an operation code (opcode) field 406, a pause time field 408, and a CRC field 410. Those skilled in the art will understand that the Pause frame 400 will typically include additional fields, such as a type field, a length field, etc.

The pause frame generator 228 preferably loads the unicast address of Switch B 104 into the DA field 402 of the Pause frame 400. Alternatively, the pause frame generator 228 may enter a multicast address into DA field 402. In the SA field 404, the pause frame generator 228 enters the address assigned to switch A 102. The pause frame generator 228 enters the opcode associated with pause frames into the opcode field 406, and enters into the pause time field 408 the amount of time that switch B 104 should suspend the transmission of additional frames. The CRC generator 230 preferably computes and loads a valid FCS into the pause frame's CRC field 410.

The pause frame 400 is then placed into free space within the output buffer 220, and the pointer is positioned to point to the pause frame 400, as indicated at block 318 (FIG. 3B). The pause frame 400, which may now be considered to be at the head 224 of the output buffer 220, is passed to the PHY layer for transmission from port P0 110 and across link 112a to Switch B 104, as indicated at block 320. By deliberately cutting short the frame originally at the head 224 of the output buffer 220, and replacing it with a pause frame 400, the present invention is able to issue the pause frame 400 faster than conventional network devices.

Upon issuing the pause frame 400, the transmitting unit 206 reloads the pointer so that it again points to the frame whose transmission was truncated, as indicated at block 322. The transmitting unit 206 then proceeds to pass this frame in its entirety, together with a valid FCS, to the PHY layer for transmission from port P0 110. In the illustrative embodiment, this completes the steps performed by the port P0 110 in response to having detected an impending full condition at its input buffer 208, as indicated by end block 324.

In an alternative embodiment, the transmitting unit 206 disrupts transmission of the frame currently at the head 224 of the output buffer 220, only if that frame is a data frame. If it is a control frame, the transmitting unit 206, operating in accordance with this alternative embodiment, allows the entire control frame together with a valid FCS to be sent from Switch A 102 before sending the pause frame 400.

The pause frame 400 from port P0 110 at switch A 102 traverses link 112a, and is received by switch B 104 at its port P2 110 (FIG. 1). At switch B 104, the pause frame 400 is received by the switch's PHY layer and passed to its MAC layer. In particular, the pause frame 400 is placed at the tail 212 of the input buffer 208 at Switch B 104, as indicated at block 326 (FIG. 3C). Even though the pause frame 400 is at the tail 212 of the input buffer 208, the pause detector 216 may be configured to identify this frame as a pause frame 400, and retrieve it from the input buffer 208 for immediate processing, as indicated at block 328, notwithstanding the presence of other data and/or control frames within the input buffer 208 that are ahead of the pause frame 400. The pause detector 216 of the receiving unit 202 notifies the flow control engine 204 that a pause frame 400 from Switch A 102 has been received, as indicated at block 330.

In response, the flow control engine 204 at Switch B 104 directs the transmitting unit 206 to truncate the frame presently at the head 224 of its output buffer 220 for port P2, as indicated at block 332. That is, it stops passing any further portions of the frame to the PHY layer. The flow control engine 204 also directs the CRC generator 230 to deliberately corrupt the FCS appended to this truncated frame, as indicated at block 334. As described before, the CRC generator 230 preferably computes the corrupted error detection signature by inverting the last data bit of the truncated frame. The truncated frame is received at Switch A 102, which detects an error with the received frame, due to the corrupted error detection signature. Switch A 102 preferably discards the frame, and does not treat it as a valid frame. The CRC checker 219 at Switch A 102 similarly may be configured to check whether the frame's FCS was deliberately corrupted by computing a second error detection signature with the last data bit of the truncated frame inverted. If the FCS is found to have been deliberately corrupted, as here, Switch A 102 may suppress its error counter. In addition to truncating and corrupting the frame currently at the head 224 of its output buffer 220, the flow control engine 204 also directs the transmitting unit 206 to suspend its transmission of frames from its port P2 to port P0 at Switch A 102 for the period of time specified in the received pause frame 400, as indicated at block 336. That is, the flow control engine 204 and/or the transmitting unit 206 at Switch B 104 may include a timer (not shown) that is started when the PAUSE frame 400 is detected. Until the timer reaches the specified time, the transmission of at least data frames is suspended.

Upon expiration of the specified time, the transmitting unit 206 resumes the transmission of frames from port P2 at switch B 104 to port P0 at Switch A 102. In particular, the transmitting unit 206 resends the entire frame, which was previously truncated, as indicated at block 338. The CRC generator 230 computes and appends a valid FCS to the frame being resent, as also indicated at block 338. The transmitting unit 206 then shifts all of the remaining frames in its input buffer 220. As each frame reaches the head 224 of the output buffer 220, it is passed to the PHY layer together with a valid FCS for transmission from port P2 to port P0 at Switch A 102, as indicated at block 340. Processing of the received Pause frame 400 is then complete, as indicated by end block 342.

It should be understood that the transmitting unit at switch B 104 may only suspend the transmission of data frames to port P0 at Switch A, pending the expiration of the pause time. Control frames may continue to be sent to port P0 at Switch A 102, notwithstanding its issuance of a pause frame 400.

Those skilled in the art will recognize that other methods may be used to implement the present invention. Those skilled in the art will further understand that the steps described herein may be performed by other components, in different orders, in parallel, etc.

The foregoing description has been directed to specific embodiments of this invention. It will be apparent, however, that other variations and modifications may be made to the described embodiments, with the attainment of some or all of their advantages. For example, a single flow control engine may service multiple ports. Alternatively, some other error checking mechanism, besides CRC, may be used, such as the computation of error correction codes (ECCs). Therefore, it is an object of the appended claims to cover all such variations and modifications as come within the true spirit and scope of the invention.

What is claimed is:

1. A system for controlling the flow of frames within a computer network, the system comprising:

a receiving unit having an input buffer for temporarily storing received frames, and a congestion detector coupled to the input buffer, whereby the congestion detector is adapted to detect an impending full condition at the input buffer;

a transmitting unit having an output buffer for storing a frame being transmitted;

a control frame generator coupled to the output buffer, and adapted to create a pause frame;

a flow control engine operably coupled to the receiving unit and the transmitting unit, whereby the flow control engine, in response to the congestion detector detecting an impending full at the input buffer, (i) directs the control frame generator to create a pause frame, and (ii)

directs the transmitting unit to truncate at least one frame at the output buffer, and to transmit the pause frame; and an error checker configured to compute error detection signatures to be appended to frames, wherein the flow control engine directs the error checker to deliberately corrupt an error detection signature to be appended to the truncated frame to cause the truncated frame to be discarded.

2. The system of claim 1 wherein the flow control engine directs the transmitting unit to re-send, in its entirety, the frame that was truncated, and directs the error checker to compute a valid error detection signature for the re-sent frame.

3. The system of claim 1 wherein the error detection signature is a frame check sequence (FCS), the truncated frame includes a last data bit, and the deliberately corrupted FCS is computed by inverting the last data bit of the truncated frame.

4. The system of claim 1 wherein the receiving unit, the transmitting unit, the control frame generator and the flow control engine are disposed on a switch on a chip.

5. The system of claim 1 wherein the pause frame conforms to IEEE Std. 802.3-2002.

6. A system for controlling the flow of frames within a computer network, the system comprising:

a receiving unit having an input buffer for temporarily storing received frames;

a transmitting unit having an output buffer for temporarily storing a frame being transmitted;

a flow control engine operably coupled to the receiving unit and the transmitting unit, whereby the flow control engine, in response to the receiving unit receiving a pause frame specifying a pause time, directs the transmitting unit (i) to truncate the frame being transmitted from the output buffer, and (ii) to suspend transmitting frames until expiration of the specified pause time; and an error checker configured to compute error detection signatures to be appended to frames, wherein the flow control engine directs the error checker to deliberately corrupt an error detection signature to be appended to the truncated frame to cause the truncated frame to be discarded.

7. The system of claim 6 wherein, upon expiration of the specified pause time, the flow control engine directs the transmitting unit to re-send, in its entirety, the frame that was truncated, and directs the error checker to compute a valid error detection signature for the re-sent frame.

8. The system of claim 6 wherein the error detection signature is a frame check sequence (FCS), the truncated frame includes a last data bit, and the deliberately corrupted FCS is computed by inverting the last data bit of the truncated frame.

9. The system of claim 6 wherein the receiving unit, the transmitting unit, and the flow control engine are formed on at least one microchip.

10. A method for controlling the flow of frames at a network entity, the method comprising:

temporarily storing frames received by the network entity in an input buffer;

detecting an impending full condition at the input buffer;

in response to detecting the impending full condition, truncating a frame being transmitted by the network entity;

appending deliberately corrupted error detection signature to the truncated frame to cause the truncated frame to be discarded; and transmitting a pause frame from the network entity.

11. The method of claim 10 wherein the error detection signature is a frame check sequence (FCS), the truncated frame includes a last data bit, and the deliberately corrupted FCS is computed by inverting the last data bit of the truncated frame.

12. The method of claim 10 further comprising:

appending a valid error detection signature to the frame whose transmission was truncated; and re-transmitting, in its entirety, the frame whose transmission was truncated.

13. A method for controlling the flow of frames at a network entity, the method comprising:

detecting receipt of a pause frame from a second network entity whereby the pause frame specifies a pause period;

in response to detecting the pause frame, truncating a frame being transmitted to the second network entity;

appending deliberately corrupted error detection signature to the truncated frame to cause the truncated frame to be discarded; and suspending transmission of additional frames to the second network entity pending the specified pause period.

14. The method of claim 13 further comprising:

appending a valid error detection signature to the frame whose transmission was truncated; and upon expiration of the specified pause period, re-transmitting, in its entirety, the frame whose transmission was truncated.

15. A system for controlling the flow of frames within a computer network, the system comprising:

a first network entity; and a second network entity in communicating relationship with the first network entity, wherein the first network entity includes:

a receiving unit having an input buffer for temporarily storing received frames, and a congestion detector coupled to the input buffer, whereby the congestion detector is adapted to detect an impending full condition at the input buffer, a transmitting unit having an output buffer for storing a frame being transmitted, a control frame generator coupled to the output buffer, and adapted to create a pause frame, and a flow control engine operably coupled to the receiving unit and the transmitting unit, whereby the flow control engine, in response to the congestion detector detecting an impending full at the input buffer, (i) directs the control frame generator to create a pause frame, and (ii) directs the transmitting unit to truncate at least one frame at the output buffer, and to transmit the pause frame to the second network entity, an error checker configured to compute error detection signatures to be appended to frames, wherein the flow control engine directs the error checker to deliberately corrupt an error detection signature to be appended to the truncated frame to cause the truncated frame to be discarded, and the second network entity includes:

a receiving unit having an input buffer for temporarily storing received frames;

a transmitting unit having an output buffer for temporarily storing a frame being transmitted; and a flow control engine operably coupled to the receiving unit and the transmitting unit, whereby the flow control engine, in response to the receiving unit receiving the pause frame specifying a pause time from the first network entity, directs the transmitting unit (i) to truncate the frame being transmitted from the output buffer, and (ii) to suspend transmitting frames additional frames to the first network entity until expiration of the specified pause time, and an error checker configured to compute error detection signatures to be appended to frames, wherein the flow control engine directs the error checker to deliberately corrupt an error detection signature to be appended to the truncated frame to cause the truncated frame to be discarded.

16. The system of claim 1 wherein the error checker deliberately corrupts the error detection signature by inversion of one or more bits of the truncated frame before computation of the error detection signature.

17. The method of claim 10 wherein the appending the deliberately corrupted error detection signature comprises inverting one or more bits of the truncated frame before computing the error detection signature.

* * * * *

UNITED STATES PATENT AND TRADEMARK OFFICE
CERTIFICATE OF CORRECTION

PATENT NO.         : 7,751,328 B2                                                  Page 1 of 1
APPLICATION NO.    : 11/356893
DATED              : July 6, 2010
INVENTOR(S)        : Raymond Kloth It is certified that error appears in the above-identified patent and that said Letters Patent is hereby corrected as shown below:

Col. 9, Line 64, please replace "appending deliberately" with "appending a deliberately"

Col. 10, Line 18, please replace "appending deliberately" with "appending a deliberately"

Signed and Sealed this
Twenty-second Day of March, 2011

David J. Kappos
*Director of the United States Patent and Trademark Office*